May 13, 1958     A. D. HERMAN     2,834,087
V-BAND CLAMP WITH INTEGRAL STRENGTHENING RIBS
Filed May 21, 1957

INVENTOR.
ALBERT D. HERMAN
BY *Sellers and Latta*
—ATTORNEYS—

United States Patent Office 2,834,087
Patented May 13, 1958

2,834,087

V-BAND CLAMP WITH INTEGRAL STRENGTHENING RIBS

Albert Dale Herman, Encino, Calif.

Application May 21, 1957, Serial No. 660,667

14 Claims. (Cl. 24—279)

This invention relates to V-band clamps for coupling together the flanged end of aligned tube sections, of the type wherein a plurality of segments of V-channel section, functioning as jaws to embrace corresponding segments of the mating tube flanges, are attached to a flexible constrictor band in a manner to cooperatively provide a segmental coupling collar of substantially 360° extent for embracing the tube flanges throughout their periphery and applying thereto axial pressure for drawing the flanges tightly against an interposed gasket or otherwise effecting a sealing connection between the flanges. In such V-band clamps, the axially opposed side wall members of the channel segments diverge toward the coupling axis in order to effect a wedging action against the tube flanges as the segments are crowded radially inwardly against the flanges. The reactive force of the tube flanges against the jaws of the clamp segments tends to spread the jaws as the clamp is tightened by the application of circumferential tension forces in the flexible band. For many years past, the problem of reinforcing the clamp segments against this spreading action has produced many proposals embodying the use of separate reinforcing parts applied to the rolled channel segments, and in other attempts to solve the problem, various types of reinforcing of the "feet" or side flanges at the radially inner margins of the jaw segments, have been utilized. In many cases, combinations of reinforcement in the feet and additional reinforcing means, have been utilized. Reinforcement solely through the feet of the jaw segments is of limited benefit and cannot provide sufficient rigidity for meeting the increasing demands for higher loading of the segments in their clamping operation. On the other hand, various expedients involving the application of separate reinforcing braces, etc. are objectionable because of the complexity and the added cost of manufacture they involve.

With the foregoing in mind, the present invention has as its general object to provide a band clamp of the general type indicated, embodying a plurality of jaw segments each of one piece sheet metal structure formed with a series of integral buttress elements which brace the jaw segments in a manner to provide greatly improved rigidity and resistance to spreading of the jaws.

The invention embodies the concept of a series of V-section jaw elements arranged in circumferentially separated relation to one another but with sufficiently close circumferentially spacing to apply clamping pressure to the tube flanges at close enough intervals to adequately distribute the clamping pressure uniformly throughout the circumference of the mating flanges; together with a series of buttress elements which function purely to reinforce and brace the jaw elements against spreading, the buttress elements being interposed in alternating relation between the jaw elements around the circumference of the clamp, and being integrally joined to the ends of the jaw elements throughout substantially the full cross sectional area thereof so as to provide maximum reinforcing connections to the jaw elements.

A further object is to provide a V band clamp embodying such clamping segments, wherein the buttressing elements are arranged to seat against the inner face of the constrictor band throughout the full axial width of the band so as to transmit radially inwardly directed constricting forces throughout the band to all sections of the cross sectional area of the jaw segments in a manner to provide maximum bracing loading of the jaw elements against spreading under the reaction loading of the tube flanges.

Other objects and advantages will become apparent in the ensuing specifications and appended drawings in which.

Figure 6:
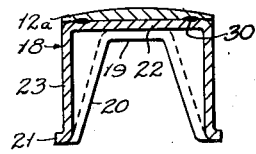
Fig. 6 is a sectional view showing a modified form of the constrictor band.
Figure 1:
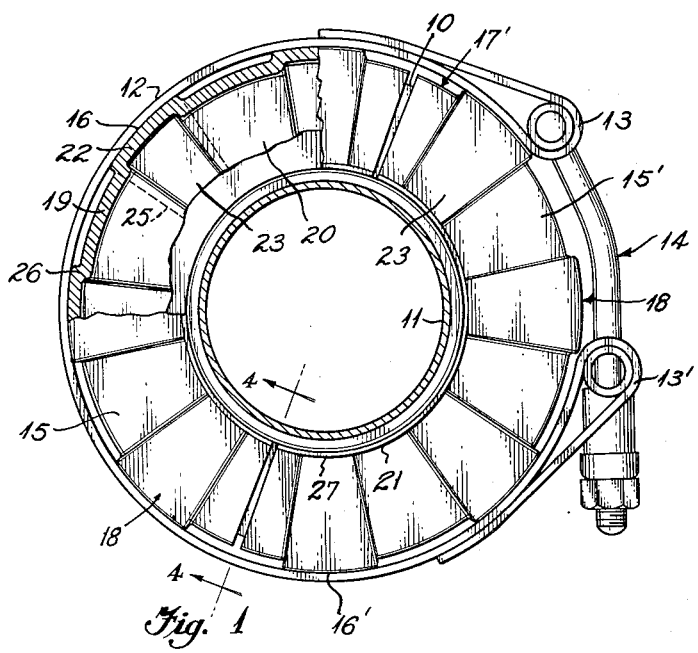
Fig. 1 is a transverse sectional view through a line of tubing embodying my improved V band clamp as a coupling between flanged ends thereof, a portion of one of the coupling segments being broken away and shown in section to better illustrate the structure thereof.

Referring now to the drawing in detail, I have shown therein, as an example of one form in which the invention may be embodied, a V band clamp for establishing a coupling connection between flanges 10 and 10' on the ends of respective tube sections 11, 11'. The flanges may be separate parts suitably attached by welding to the tube sections 11, 11' or may be integral roll-formed end portions of the tube sections.

My improved V band clamp comprises generally a constrictor band 12 of flexible ribbon metal having loops 13, 13' at its respective ends, any conventional means for drawing the ends of the band together, such as the coupling bolt assembly indicated generally at 14 (not particularly described herein because well known) and a pair of coupling segments 15, 15' which are attached, as by spot welding, to the inner face of the band 12 at suitable points such as those indicated at 16, 16' respectively. While there are only two of the coupling segments 15, 15' illustrated, it will be understood that any selected number of segments, either two, three, four, or more, may be utilized, depending upon the diameter of the coupling and other requirements of particular types of installations.

The coupling segments 15, 15' are of rolled and formed sheet metal construction. Each of them embodies a series of circumferentially separated jaw elements 17, 17' and a series of intervening buttress elements 18 arranged in alternating relation between the jaw elements 17, 17'. The jaw elements 17, each of which is an intermediate jaw element disposed between a pair of the buttress elements 18, are each joined at both ends to respective buttress elements 18, while the jaw elements 17', which are end elements, are each joined at one end to a respective buttress element 18.

As an alternative construction, it may be preferable in many cases to attain maximum spread-resistance by arranging the buttress elements at the ends of the segments, eliminating the end jaw elements 17'.

The jaw elements 17, 17' are of conventional truncated V-channel cross section, each including a crown web 19 arranged as a segment of a cylinder, a pair of jaws 20 joined integrally to respective sides of a respective web 19 and diverging axially and toward the coupling axis, and a pair of reinforcing feet 21 integral with the inner extremities of the respective jaws 20 and projecting axially therefrom as segments of a cylindrical surface.

Each of the buttress elements 18 is of box form, including a crown portion 22 of rectangular platform arranged as a segment of a common cylindrical surface corresponding to the inner surface of the constrictor band 12, a pair of end wall portions 23 each disposed in a radial plane, normal to the coupling axis and common to the corresponding end wall portions of the remaining buttress elements 18, and each including a pair of arch members indicated generally at 24, each disposed in a generally radial plane which either intersects the coupling axis as shown or is parallel and close to a plane of the coupling axis, the preferred arrangement being that in which the arch members are disposed in radial planes, for maximum reinforcing action. Each of the arch members 24 includes a pair of generally triangular legs 25 disposed at respective ends of the respective buttress elements, and a bridging web 26 extending between and joining the respective legs 25 across the central prong area of the coupling segments. The bridging webs 26 are joined integrally to the respective ends of crown web portions 19 of respective jaw elements 17, 17' throughout the axial width thereof; the legs 25 have inclined inner marginal portions integrally joined to the respective ends of the jaws 20 of adjoining jaw elements 17, 17', and the inner ends of legs 25 are integrally joined to respective ends of respective feet 21 of the jaw elements. In each case, there is a substantially right-angle bend constituting the integral junction between the respective parts of the arch members 24 and of the jaw segments 17, 17'. The feet 21 are continued, in reduced width, past the ends of respective buttress elements 18, in web flange parts 27 which are integrally joined, through right angle bends, with the radially inward extremities of the end members 23 of respective buttress elements. An annular wedge shaped open space 28, to receive the tube flanges, extends uninterruptedly through the consecutive jaw elements 17', 17 and buttress elements 18 and is embraced consecutively by the jaws 20, the legs 25 and the end members 23.

Figure 4:
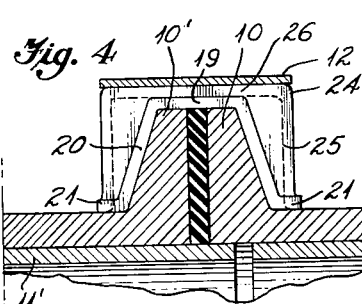
Fig. 4 is an axial sectional view taken on the line 4—4 of Fig. 1.
Figure 2:
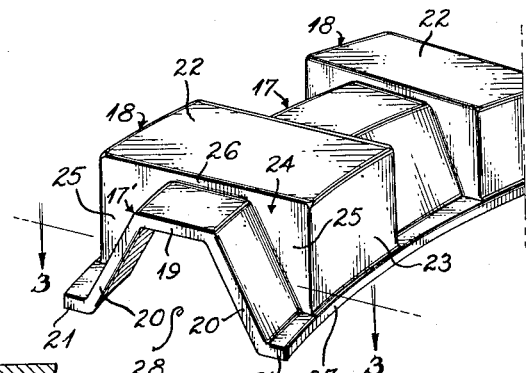
Fig. 2 is a perspective view of one end portion of the improved coupling segment of my invention.
Figure 3:
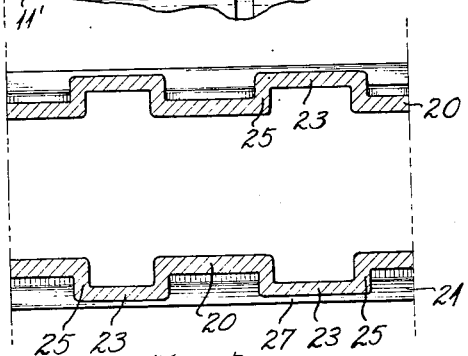
Fig. 3 is a sectional view taken on an arcuate surface indicated by the line 3—3 of Fig. 2, through the sides of a portion of a coupling segment.

In operation, the constricting tension loads developed in constrictor band 12 by tightening the connector 14, develop resultant radial loads applied toward the coupling axis through the heads 22 of the buttress element 18. As will be apparent in Fig. 4, the axial length of each head 22 corresponds to the width of the band 12 and the full area of each head 22 is therefore engaged by the corresponding area of the band. The radial loads are therefore transferred inwardly throughout the axial length of each buttress element 18, and are concentrated in the end areas of the buttress elements, where the reaction loads are received from the respective jaws 20. Accordingly, the radially inward loading is transmitted largely through the end members 23 and the legs 25 of the arch member 24, directly to the feet 21 and the ends of the jaws 20, through the integral right angle bends joining these parts. The crown webs 19 of the jaw segments 17, 17', being recessed below the crown members 22 of the buttress elements 18, do not receive any radial loading directly from the band 12. Consequently, the radially inward loading is transferred completely through the buttress elements 18 and is converted almost entirely into bracing action transferred to the jaws 20 through the legs 25, for resisting the spreading reaction of the flanges 10, 10' against the jaws 20.

Any tendency of the buttress elements 18 to buckle in their central areas in response to the reaction loads transmitted to them, is resisted by (a) the full seating support of the band 12 against the respective end portions of crown members 22 and (b) the slight cylindrical arching of the crown members 22 circumferentially, which adds rigidity thereto in accordance with the principle of rigidity imparted to a tube section by the cylindrical arching of the wall thereof.

In the fabrication of segments 17, 17', ribbon metal of an appropriate width is first passed through a rolling machine and rolled into a continuous channel having approximately the cross section of jaw segments 17, 17'. The continuous channel may be taken from the rolling machine in the form of a helical coil of approximately the radius of the coupling segment that is to be finally fabricated. This coil may then be separated by a cutoff operation into individual segments of the plain channel section, having the appropriate length. These channel segments are then reworked in a forming die in a punch press, with a deep drawing and coining action in which separated sections of the V channel are expanded into the box shape of the respective buttress elements 18, and at the same time the entire segment is straightened to eliminate its helical twist and is given the exact radius of curvature and cross sectional contour. The segments are then mounted to the band 12.

Alternatively, the segments may be formed initially from flat stock to their final form in a die forming operation in a punch press, omitting the initial roll-forming step.

Figure 5:
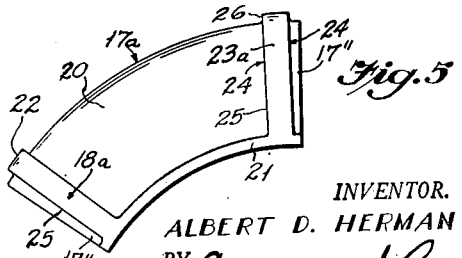
Fig. 5 is a side view of a segment embodying a modified form of the invention.

Referring now to Fig. 5, there is illustrated therein a segment of minimum length comprising a minimum number of the jaw elements and buttress elements. In such a minimum segment, for maximum reinforcing purposes the two elements are reinforcing bridge elements 18a and a single jaw element 17a is interposed between the bridge elements 18a. The latter may have their outer end walls 25 terminating in flanged ends 17'' of the same cross-sectional contour as jaw element 17.

Figure 7:
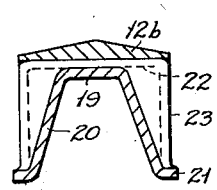
Fig. 7 is a sectional view of another modified form of the invention.

Figs. 6 and 7 illustrate modifications of the invention wherein the constrictor bands 12a and 12b respectively are given a cross section of truss form, self rigidifying in an axial direction, supplementing the rigidifying effect of tension in the cylindrical surface of the band, thus providing for maximum efficiency in the transfer of hold-down pressure from the band to the coupling segments throughout full band width.

The invention provides a number of distinct improvements in V-band clamps. It provides for full band width transfer of hold-down pressure through the bridge elements 18 to the foot areas of the band in a minimum of two areas in each segment. In such foot areas of the bridge element, these hold-down pressures are resolved into forces resisting axial spreading of such foot areas. These spread-resisting forces function as restraining forces which are transferred through circumferential hoop tension directly into the integrally joined foot areas of the jaw element or elements 17, thus restraining the latter from spreading under the reactive loads generated in the application of clamping forces against the tubing flanges. The magnitude of these restraining forces is relatively independent of the circumferential extent of the segment. Thus, while maintaining extremely high axial loading capacity, the segments may be reduced to much smaller arcuate length than is feasible in conventional V-band clamps with plain V-section segment. Thus it becomes possible to distribute the areas of clamping action more uniformly, in more frequent intervals around the circumference of the tubing flanges being coupled, than is possible with the conventional V-band clamp with fewer segments, and yet at the same time to actually increase the loading capacity of the clamp. Furthermore, this is accomplished without any increase in weight. That is to say, the reinforcing bridge elements 18, being formed directly in the integral wall structure of the V-channel section material, add no weight to the segment of plain channel section material in which it is formed. At the same time, the loading capacity of the formed segment is far above the loading capacity of a corresponding segment of the same material and dimensions, of the plain V-section form. Conversely, it is possible to considerably reduce the thickness and weight of material in a segment having the reinforcing bridge elements of this invention, over a plain V-section segment of the same dimensions, while maintaining equal loading capacity.

In the conventional segment, the inherent resistance of the V-section material to spreading, which resistance in itself is inadequate for loading requirements, is supplemented by the stiffening action derived from the arched form of the reinforcing feet. But such stiffening action is proportional to the extent of arching of the feet. As the segment is shortened, the arcuate contour approaches a straight contour, with an attendant loss of spread-resisting strength. This effect is minimized in the segment of this invention, as explained above.

The invention attains the further advantage of embodying the function of a ventilated clamp, the air spaces within the reinforcing bridge elements 18, combined with the irregular surface contour (which affords greater heat radiating efficiency than in the corresponding plain segment) affords a considerably improved cooling action in the segment of this invention as contrasted to the corresponding plain segment.

Fig. 5 illustrates a preferred proportioning between the buttress bridges 18a and the jaw elements 17a wherein the latter are of maximum circumferential extent and the former are of minimum circumferential width. Since most of the reinforcing strength is derived from the arches 24 and the legs 25 thereof (the area of which is the same regardless of the circumferential width of the ends wall 23a), the maximum area of a segment is preferably devoted to the jaw element 17a which engages the tube flanges.

Fig. 6 illustrates a preferred arrangement of the spot weld 30 or other securing means (e. g. rivets), for attaching the constrictor band to the segments. To avoid weakening the central area of the segment, these points of attachment are located as near as possible to the end extremities of the buttress bridges 18a. Thus maximum strength is preserved in the central areas where bending stresses, derived from the spreading forces acting on the segment, are concentrated at maximum intensity, and the weakening effect of spot welding or riveting is disposed in areas of the bridge elements 18a which can best accept such weakening effect.

The invention further contemplates the possibility of leaving, in the crown portions 19 of the jaw elements 17, some of the transversely curved arching which inherently develops in these crown portions in the rolling operation wherein the V-section material is originally formed. In conventional V-band clamps, in order to flatten the crown section sufficiently for attachment to the constrictor band, it is the practice, after the diverging jaws of the segments have been adequately formed, to pass the channel material through one final pair of rolls which function merely to flatten the crown portion of the V-section for proper attachment to the constrictor band. The additional work hardening that comes from this last rolling step tends to overwork the crown section where the bending forces derived from the spreading loads against the jaws, are concentrated. Since the crown section of the V-band segment of this invention is not required to be seated against the band, the invention makes it possible to eliminate the final flattening operation and to leave the crown portion of the segment with a somewhat curved section and with a resulting greater resistance to the loading stresses.

In the segment of Fig. 5 there will be some contact between the constrictor band and the central area of the crown portion of the jaw element midway between the buttress bridges 18a, due to the tendency of the band to straighten under tension. Some radial loading of the jaw segment will be applied at these points but the majority of the radial loading is applied through the buttress elements 18a.

The invention provides the improved result of distributing the flange-clamping pressure of the jaw segments at uniformly spaced, sufficiently frequent intervals around the circumferential areas of the flanges, to attain substantially uniform pressure of the flanges against the interposed gasket, for the maximum sealing efficiency, as contrasted to non-uniform circumferential distribution of clamping forces in V-band clamps utilizing three or four jaw segments of uninterrupted V-section, which tend to establish maximum clamping forces at irregularly spaced intervals due to the uncontrolled occurrence of "high spots" through slight departures from true mating fit between the jaw segments and the flanges because of the circumferential extent of the uninterrupted mating areas and variances occurring in manufacturing tolerances and in quality of material.

The invention provides the further advantage of interrupting the circumferential continuity of the crown areas of the segments, where failure cracks first appear due to the combination of maximum load stress and maximum brittleness through work-hardening. In conventional V-band clamps, under high loading conditions, such failure cracks, once started, will extend themselves circumferentially in the crown area of a jaw segment until the segment finally fails along its full circumferential length, and separates into two fragments. In the present invention, the buttress elements interrupt the crown areas of the segments so as to prevent such spreading of failure cracks, as well as relieving the crown areas of maximum stress loading from the beginning, so that failure cracks are not likely to appear.

I claim:

1. In a V-band clamp for coupling together a pair of tube flanges, in combination: a flexible constrictor band of ribbon metal having means to connect the ends thereof and to develop constricting tension therein; and a plurality of arcuate coupling segments attached to said band in an arrangement such as to collectively constitute a coupling collar of substantially 360° circumferential extent when drawn around a pair of flanges, each segment comprising a plurality of circumferentially separated coupling jaw elements and a plurality of buttress elements in alternating relation to said jaw elements and integrally joining the same, each jaw element being of truncated V-channel section, including a crown web portion and a pair of integral jaws diverging axially and toward the coupling axis from respective axial extremities of the respective crown web portion, each of said buttress elements including a peripheral head member seated against a respective area of the inner face of said constrictor band, having respective end portions extending axially beyond the axial extremities of said crown webs, and having respective axially extending side margins the central portions of which are integrally joined to the circumferential extremities of the respective crown webs, a pair of bracing legs joined integrally to respective end portions of each of said side margins of the head member and extending inwardly in a common plane parallel and adjacent to the coupling axis, said legs having inner margins joined integrally to respective ends of respective jaws, and a pair of end members integral with respective axial extremities of said head member and extending generally radially inwardly in axially spaced planes transverse to the coupling axis and joined integrally to the outer margins of said legs by dihedral bends extending generally radially, said legs and end members transmitting from said constrictor band to said jaws, radially inwardly directed loading derived from radially constricting forces resulting from the tension developed in said constrictor band, whereby to brace said jaws against spreading under the wedging reaction loads received by said tube flanges as they are drawn together by said flanges.

2. In a V-band clamp for coupling together a pair of tube flanges, in combination: a flexible constrictor band of ribbon metal having means to connect the ends thereof and to develop constricting tension therein; and a plurality of arcuate coupling segments attached to said band in an arrangement such as to collectively constitute a coupling collar of substantially 360° circumferential extent when drawn around a pair of flanges, each segment comprising a plurality of circumferentially separated coupling jaw elements and a plurality of buttress elements in alternating relation to said jaw elements and integrally joining the same, each jaw element being of truncated V channel section, including a crown web portion, a pair of integral jaws diverging axially and toward the coupling axis from respective axial extremities of said crown web portion, and a pair of reinforcing feet extending axially in spreading relation from the radially inner extremities of the respective jaws, each of said buttress elements including a peripheral head member seated against a respective area of the inner face of said constrictor band, having respective end portions extending axially beyond the axial extremities of said crown web, and having respective axially extending side margins the central portions of which are integrally joined to the circumferential extremities of adjoining crown webs, a pair of bracing legs joined integrally to respective end portions of each of said side margins of the head member and extending inwardly in a common plane parallel to and adjacent to the coupling axis, said legs having inclined inner margins joined integrally to respective ends of respective jaws throughout the radial height thereof and a pair of end members integral with respective axial extremities of said peripheral head member and extending generally radially inwardly in axially spaced planes transverse to the coupling axis, said end members being joined integrally to the outer margins of said webs by dihedral bends extending generally radially and terminating at their radially inward extremities in reinforcing flanges constituting circumferential continuations of the respective reinforcing feet of said jaw elements, said legs and end members transmitting from said constrictor band to said jaws, radially inwardly directed loading derived from radially constricting forces in said constrictor band resulting from the tension developed therein, whereby to brace said jaws against spreading under the wedging reaction loads received from said tube flanges as they are drawn together by said clamp.

3. In a V-band clamp for coupling together a pair of tube flanges, in combination: a flexible constrictor band of ribbon metal having means to connect the ends thereof and to develop constricting tension therein; and a plurality of arcuate coupling segments attached to said band in an arrangement such as to collectively constitute a coupling collar of substantially 360° circumferential extent when drawn around a pair of flanges, each segment comprising at least one coupling jaw segment and a plurality of buttress elements integrally joined to respective ends of said jaw element in circumferentially alternating array, each jaw element being of truncated V-channel section, including a crown web portion and a pair of integral jaws diverging axially and toward the coupling axis from respective axial extremities of the respective crown web portion, each of said buttress elements including a peripheral head member seated against a respective area of the inner face of said constrictor band, having respective end portions extending axially beyond the axial extremities of said crown webs, and having respective axially extending side margins the central portions of which are integrally joined to the circumferential extremities of the respective crown webs, a pair of bracing legs joined integrally to respective end portions of each of said side margins of the head member and extending inwardly in a common plane parallel and adjacent to the coupling axis, said legs having inner margins joined integrally to respective ends of respective jaws, and a pair of end members integral with respective axial extremities of said head member and extending generally radially inwardly in axially spaced planes transverse to the coupling axis and joined integrally to the outer margins of said legs by dihedral bends extending generally radially, said legs and end members transmitting from said constrictor band to said jaws, radially inwardly directed loading derived from radially constricting forces resulting from the tension developed in said constrictor band, whereby to brace said jaws against spreading under the wedging reaction loads received by said tube flanges as they are drawn together by said flanges.

4. In a V-band clamp for coupling together a pair of tube flanges, in combination: a flexible constrictor band of ribbon metal having means to connect the ends thereof and to develop constricting tension therein; and a plurality of arcuate coupling segments attached to said band in an arrangement such as to collectively constitute a coupling collar of substantially 360° circumferential extent when drawn around a pair of flanges, each segment comprising at least one coupling jaw segment and a plurality of buttress elements integrally joined to respective ends of said jaw element in circumferentially alternating array, each jaw element being of truncated V-channel section, including a crown web portion, a pair of integral jaws diverging axially and toward the coupling axis from respective axial extremities of adjoining crown web portions, and a pair of reinforcing feet extending axially in spreading relation from the radially inward extremities of the respective jaws, each of said buttress elements including a peripheral head member, seated against a respective area of the inner face of said constrictor band, having respective end portions extending axially beyond the axial extremities of said crown web, to a width substantially equal to the axial width between the margins of said feet, and having respective axially extending side margins the central portions of which are integrally joined to the circumferential extremities of the adjoining crown webs, a pair of bracing legs joined integrally to respective end portions of each of said side margins of the head member and extending inwardly in a common plane of the coupling axis, said legs having inner margins joined integrally to respective ends of the respective jaws throughout the radial height thereof, and a pair of end members integral with respective axial extremities of said peripheral head member and extending inwardly therefrom in axially spaced planes normal to the coupling axis and joined integrally to the outer margins of said legs by dihedral bends extending radially, and terminating at their radially inner extremities in axially spreading flange elements constituting circumferential continuations of said jaw element feet for the outer portions of the width thereof and bridging between said feet, said legs and end members transmitting from said constrictor band to said jaws, radially inwardly directed loading derived from radially constricting forces set up in said band by tension developed therein, whereby to brace said jaws against spreading under the wedging reaction loads received from said tube flanges as they are drawn together by said clamp.

5. A band clamp as defined in claim 4, wherein said head members of the buttress elements are disposed radially outwardly of said crown web portions of said jaw elements and are joined integrally thereto by offset corner webs which add to the buckling resistant stiffness of said buttress elements, said crown web portions being spaced radially inwardly from said band whereby the entire radial loading of the latter is transmitted through said buttress elements.

6. A band clamp as defined in claim 5, wherein said head members of the buttress elements are offset radially outwardly from said crown web portions of the jaw elements, with the said crown web portions being spaced inwardly from said constrictor band so that the entire radial loading of said constrictor band is applied through said buttress elements.

7. A V-band clamp as defined in claim 3, wherein said head members of the buttress elements are of cylindrical surface contour, fully contacting the inner surface of said constrictor band throughout their entire area and having inherent buckling resistant stiffness.

8. A V-band clamp as defined in claim 3, wherein said constrictor band has a cross section graduated in thickness from a minimum at the axial margins of the band to a maximum at a point substantially midway between said axial margins.

9. A V-band clamp as defined in claim 3, wherein said constrictor band has a cross section graduated in thickness from a minimum at the axial margins of the band to a maximum at a point substantially midway between said axial margins, said band having a peripheral surface of crowned curvature.

10. A V-band clamp as defined in claim 3, wherein said constrictor band has a cross section graduated in thickness from a minimum at the axial margins of the band to a maximum at a point substantially midway between said axial margins, said band having frusto conical peripheral surfaces intersecting one another in the radial median plane of the band to define a wide-angle apex as the area of maximum thickness.

11. A V-band clamp as defined in claim 3, wherein said buttress elements are disposed closely adjacent the circumferential extremities of the respective segments.

12. A V-band clamp as defined in claim 3, wherein said buttress elements are disposed closely adjacent the circumferential extremities of the respective segments, and wherein said buttress elements are relatively narrow circumferentially and said coupling jaw segment is relatively extended circumferentially with respect to said buttress elements.

13. A V-band clamp as defined in claim 3, wherein each segment comprises a single jaw element and a pair of buttress elements, one adjacent each end of said single jaw element.

14. A V-band clamp as defined in claim 3, wherein each segment comprises a single jaw element and a pair of buttress elements, one adjacent each end of said single jaw element; and further including circumferentially narrow continuations of said jaw element beyond said buttress elements to provide flanged ends on said segment.

No references cited.